(12) United States Patent
Chan et al.

(10) Patent No.: US 6,915,173 B2
(45) Date of Patent: Jul. 5, 2005

(54) ADVANCE FAILURE PREDICTION

(75) Inventors: Wai T. Chan, Newburyport, MA (US); Edward A. Reitman, Nashua, NH (US); Jill P. Card, West Newbury, MA (US)

(73) Assignee: Ibex Process Technology, Inc., Lowell, MA (US)

( * ) Notice: Subject to any disclaimer, the term of this patent is extended or adjusted under 35 U.S.C. 154(b) by 118 days.

(21) Appl. No.: 10/645,209

(22) Filed: Aug. 21, 2003

(65) Prior Publication Data

US 2004/0168108 A1 Aug. 26, 2004

Related U.S. Application Data

(60) Provisional application No. 60/405,164, filed on Aug. 22, 2002.

(51) Int. Cl.[7] .............................................. G05B 13/02
(52) U.S. Cl. ............................. 700/44; 700/28; 700/21; 700/45; 700/79; 700/80; 700/81; 700/262; 714/1; 714/2; 714/20; 714/26; 714/57; 361/115; 361/127; 702/185; 702/183
(58) Field of Search ............................. 700/21, 28, 44, 700/45, 79, 80, 81, 262; 714/1, 2, 20, 26, 57; 361/115, 127; 702/183, 185

(56) References Cited

U.S. PATENT DOCUMENTS

| | | | |
|---|---|---|---|
| 5,467,883 A | | 11/1995 | Frye et al. ..................... 216/60 |
| 5,559,690 A | | 9/1996 | Keeler et al. ................ 364/164 |
| 5,654,903 A | | 8/1997 | Reitman et al. ........ 364/551.01 |
| 5,740,033 A | | 4/1998 | Wassick et al. ............. 364/149 |
| 5,784,273 A | * | 7/1998 | Madhavan .................... 700/71 |
| 6,004,017 A | * | 12/1999 | Madhavan .................... 700/71 |
| 6,268,226 B1 | | 7/2001 | Angell et al. ................. 438/16 |
| 6,738,954 B1 | * | 5/2004 | Allen et al. ..................... 716/4 |
| 2001/0032025 A1 | * | 10/2001 | Lenz et al. .................... 700/28 |

FOREIGN PATENT DOCUMENTS

| | | | |
|---|---|---|---|
| DE | 196 37 917 A1 | 3/1998 | ........... G05B/13/04 |
| WO | WO 01/57605 | 8/2001 | ........... G05B/13/04 |

OTHER PUBLICATIONS

Advanced analysis of dynamic neural control advisories for process optimization and parts maintenance;Card, J.P.; Chan, W.T.; Cao, A.; Martin, W.; Morgan, J.; Advanced Semiconductor Manufacturing Conference and Workshop, 2003 IEEI/SEMI , Mar. 31–Apr. 1.*

Utilization of the saturation effect on a DC motor drive with a fuzzy controller; Lee, C.K.; Chan, W.T.; Industrial Automation and Control: Emerging Technologies, 1995., International IEEE/IAS Conference on , May 22–27, 1995 , pp.: 342–349.*

Precast production scheduling with genetic algorithms; Chan, W.T.; Hu, H.; Evolutionary Computation, 2000. Proceedings of the 2000 Congress on , vol.: 2, Jul. 16–19, 2000, pp.: 1087–1094 vol. 2.*

Predicting failure modes to improve reliability; Reid, J.M.; Reliability and Maintainability Symposium, 1990. Proceedings., Annual , Jan. 23–25, 1990,pp.: 497–500.*

Card et al., "Dynamic Neural Control for Plasma Etch Process," *IEEE Transactions on Neural Networks*, (1997).

Dillon et al., "Guest Editorial Everyday Applications of Neural Networks," *IEEE Transactions on Neural Networks*, 8:4 (1997).

(Continued)

*Primary Examiner*—Ramesh Patel
(74) *Attorney, Agent, or Firm*—Goodwin Procter LLP

(57) ABSTRACT

Failure prediction for complex processes is performed utilizing one or more nonlinear regression models to relate operational variable values measured at two or more times to predicted process metric values and maintenance variable values.

20 Claims, 7 Drawing Sheets

OTHER PUBLICATIONS

Hatzipantelis et al., "Comparing Hidden Markov Models with Artificial Neural Network Architectures for Condition Monitoring Applications," *Artificial Neural Networks*, 26–28, Conference Publication No. 409 (Jun. 1995).

Kim et al., "Intelligent Control of Via Formation by Photosensitive BCB for MCM–L/D Applications," *IEEE Transactions on Semiconductor Manufacturing*, 12:503 (1999).

Konstantopoulos et al., "Controllers with Diagnostic Capabilities. A Neural Network Implementation. Journal of Intelligent and Robotic Systems," Department of Electrical Engineering, University of Notre Dame, IN 12: 197–228 (1995).

Moyne, "AEC/APC Vision: A Research and Suppliers' Point of View," 3$^{rd}$ Annual European AEC/APC Conference Proceedings (2002).

Rietman et al., "A Study on $\Re^m \rightarrow \Re^1$ Maps: Application to a 0.16–$\mu$m Via Etch Process Endpoint," *IEEE* (2000).

Rietman et al., "A System Model for Feedback Control and Analysis of Yield: A Multistep Process Model of Effective Gate Length, Poly Line Width, and IV Parameters", *IEEE* (2001).

Rietman, "Neural Networks in Plama Processing," *Journal of Vacuum Science and Technology; Part B, IEEE Transactions on Semiconductor Manufacturing*, 14:1 (2001).

Smyth et. al., "Hidden Markov Models an Neural Networks for Fault detection in Dynamic Systems," California Institute of Technology (1993).

Zhang et al, "Control of Spatial Uniformity in Microelectronics Manufacturing: An Integrated Approach," Proceedings of AEC/APC (2000).

* cited by examiner

ADVANCE FAILURE PREDICTION

CROSS REFERENCE TO RELATED APPLICATIONS

The present application claims the benefit of and priority to U.S. provisional application Ser. No. 60/405,164, filed Aug. 22, 2002, the entire disclosure of which is herein incorporated by reference.

FIELD OF THE INVENTION

The invention relates generally to the field of data processing and process control and, in particular, to nonlinear regression prediction and control of complex multi-step processes.

BACKGROUND

Complex multi-step production processes may be prone to failure because of their very complexity. Process failure includes both process deviations (i.e., when one or more process parameters are outside their acceptable ranges) and process shutdowns caused by, for example, incompatible or more extreme process parameter deviations. Often, there can be a substantial cost associated with the failure of complex production processes. Examples of failure-related costs include scrap material, production downtime, equipment repair and servicing, and the like.

Traditionally, process-control methods for complex processes have focused on correcting the failed process by bringing the deviating process parameters back into their acceptable ranges. Such traditional solutions are less than ideal because corrective action is taken only after the process enters a failure condition. Therefore, a failure-related cost has already been incurred for the period during which the process was operating in the failure condition. Additionally, a process shutdown, if one has not already occurred, may be required to correct problems resulting from process-parameter deviations.

What is needed is a means by which an approaching process failure is identified prior to its occurrence, i.e., advance failure prediction. However, advance failure prediction for complex processes is difficult because of the large number of variables that may affect the outcome of a process step, and/or the process as a whole.

For example, the production process for integrated circuits comprises hundreds of process steps, each of which may have dozens of controllable parameters, or inputs, that affect the outcome of the process step, subsequent process steps, and/or the process as a whole. In addition, the impact of the controllable parameters on outcome may vary from process run to process run, day to day, or hour to hour. The typical integrated circuit fabrication process thus has a thousand or more controllable inputs, any number of which may be cross-correlated and have a time-varying, nonlinear relationship with the process outcome. As a result, advance failure prediction of even a single integrated circuit process step is difficult.

SUMMARY OF THE INVENTION

Failure prediction is most effective when the method used is capable of accurately identifying precursors to failure before failure occurs. As a result, process predictions based on precursor identification can provide a process operator or process control system with advance warning to adjust the process and avoid the failure.

The present invention provides methods and systems of failure prediction for complex processes based on the identification of precursors to failure. In addition to providing advance failure prediction, in various embodiments the present invention also identifies which process parameter or parameters are most likely to cause a process failure. Accordingly, in various embodiments, the present invention further provides suggested corrective actions that may prevent a predicted process failure.

In one aspect, the invention predicts the likelihood of failure for a process having associated metrics (as defined below) and a plurality of operational variables (as defined below) by using non-linear regression to predict values for operational variables based on prior values of the operational values; and then uses non-linear regression to predict a plurality of process metric values based on the predicted values and prior operational variable values. A likelihood of a process failure is determined based on one or more of the predicted process metric values. In one embodiment, the operational variable values are predicted using a separate non-linear regression model for each of the operational variables, each such non-linear regression model having been trained in the relationship between a single predicted value of an operational variable and prior values of two or more operational variables. In some embodiments, the method can be repeated for at least one sub-process of the process. In some embodiments, the method can be repeated for a higher-level process in which the process is one component.

In another aspect, the invention predicts the likelihood of failure for a process having a plurality of operational variables by using non-linear regression models to determine predicted values at a given time for a first set of operational variables based on prior values of these variables, using non-linear regression models to determine a predicted value another time for a second set of operational variables based on prior values of these variables, and determining a likelihood of a process failure based on one or more of the predicted values at the different times. In some embodiments, the second set of operational variables are at least a subset of the first set of operational variables.

In another aspect, the invention predicts the need for maintenance activities for a process having a plurality of operational values by using non-linear regression models to determine predicted values at a given time for a first set of operational variables based on prior values of these variables, using non-linear regression models to determine predicted values at another time for a second set of operational variables based on prior values of these variables, comparing the first set of predicted values to the second set of predicted values, and determining the need for a maintenance action based at least in part on the comparison.

In some embodiments, process yield metrics are included with the two or more prior operational variable values. In some embodiments, cost data is included with the two or more prior operational variable values.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the method may be embedded on the computer-readable medium in any number of computer-readable instructions, or languages such as, for example, FORTRAN, PASCAL, C, C++, Tcl, BASIC and assembly language. Further, the computer-readable instructions can, for example, be written in a script, macro, or functionally embedded in commercially available software (such as, e.g., EXCEL or VISUAL BASIC).

In other aspects, the present invention provides a system for predicting events of a process having associated operational variables and process metrics. In one embodiment, the system comprises a process monitor and a data processing device. The process monitor monitors operational variables relating to the process. The data processing device performs advance failure prediction in any of the modes described above. The system may comprise a process controller, responsive to the data processing device, for performing maintenance activities based on the predicted process event. The system may comprise a data storage device for storing one or more maintenance activity records and maintenance activity costs. In some embodiments, the process event may be a process failure. In some embodiments, the process event may be a maintenance activity.

BRIEF DESCRIPTION OF THE DRAWINGS

A fuller understanding of the advantages, nature and objects of the invention may be had by reference to the following illustrative description, when taken in conjunction with the accompanying drawings. The drawings are not necessarily drawn to scale, and like reference numerals refer to the same items throughout the different views.

DETAILED DESCRIPTION

The invention provides a method and system for predicting process failures using predicted process metrics and operational variables. As used herein, the term "metric" refers to any parameter used to measure the outcome or quality of a process or sub-process. Metrics include parameters determined both in situ, i.e. during the running of a sub-process or process, and ex situ, at the end of a sub-process or process. As used herein, the term "operational variables" includes process controls that can be manipulated to vary the process procedure, such as set point adjustments (referred to herein as "manipulated variables"), variables that indicate the wear, repair, or replacement status of a process component(s) (referred to herein as "replacement variables"), and variables that indicate the calibration status of the process controls (referred to herein as "calibration variables"). As used herein, the term "maintenance variables" is used to refer collectively to both replacement variables and calibration variables. Furthermore, it should be understood that acceptable values of process operational variables include, but are not limited to, continuous values, discrete values and binary values.

The operational variable and metric values may be measured values, normalized values, and/or statistical data derived from measured or calculated values (such as a standard deviation of the value over a period of time). For example, a value may be derived from a time segment of past information or a sliding window of state information regarding the process variable or metric.

Figure 1:
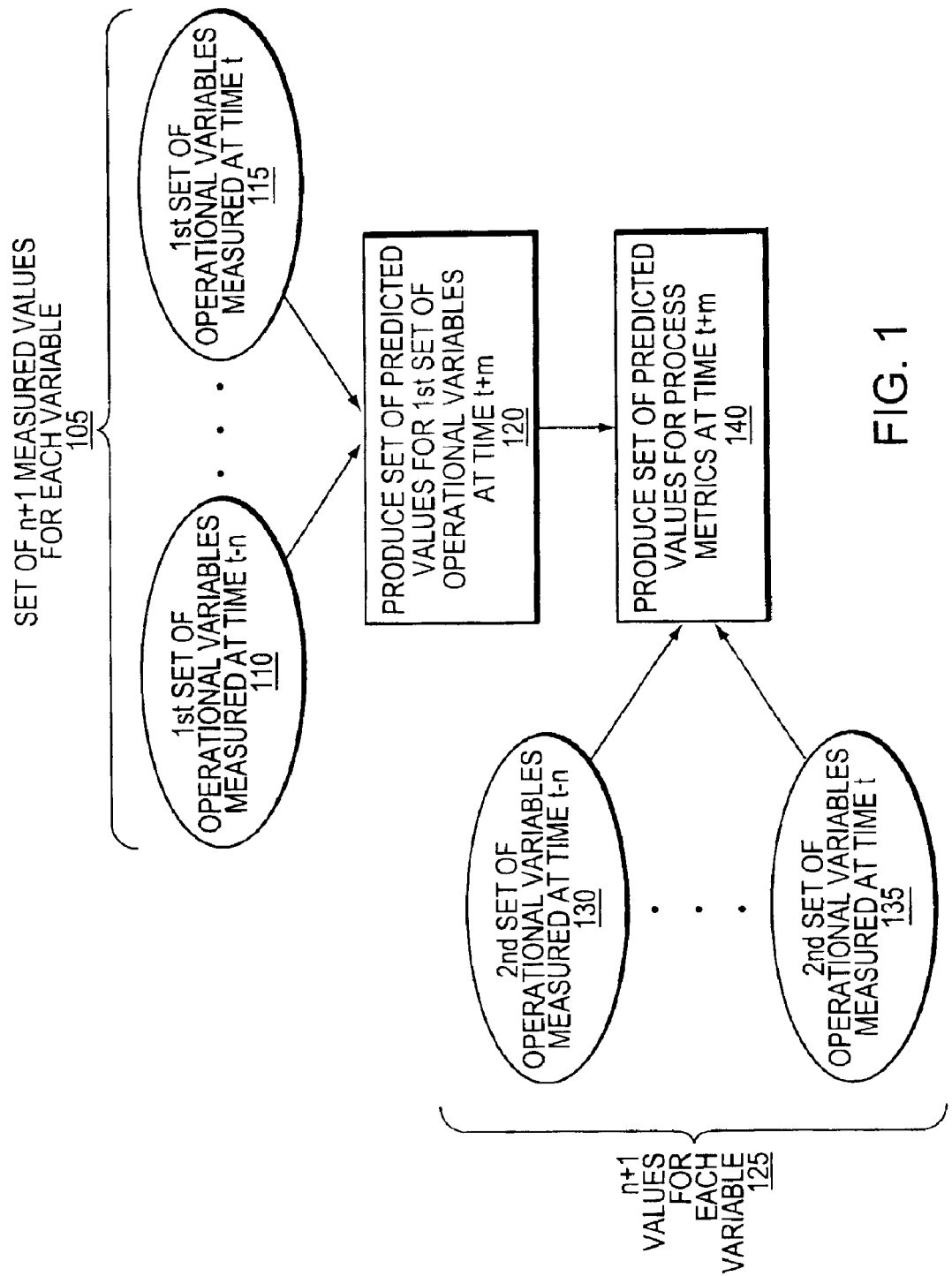
FIG. 1. is a flow diagram illustrating various embodiments of prediction of a process according to the present invention.

For example, where the process comprises plasma etching of silicon wafers, manipulated variables ("MV") may include, e.g., the RF power and process gas flow of one or more plasma reactors. Replacement variables ("RV") may include, e.g., the time since last plasma reactor electrode replacement and/or a binary variable that indicates the need to replace/not replace the electrodes. Calibration variables ("CalV") may include, e.g., time since last machine calibration and/or the need for calibration FIG. 1 illustrates one embodiment of the invention relating to failure prediction based on predicted process metrics, which are themselves derived using both predicted and prior operational values. As used herein, the term "prior" operational variable values is broad enough to comprise, for example, a substantially current value and one or more past values. Of course, prior operational variable values can also comprise only past values. The prior operational variable values can be, for example, measured, calculated and/or provided values. In addition, predicted operational variable values may be used as prior operational variable values in order to facilitate further predictions. A first set of operational variables 105 is measured at time t−n (110) and again at least one additional time up to time t (115). These measurements 110 through 115 of the first set of operational variables 105 are used to produce a set of predicted values for the first set of operational variables at a future time t+m (120). A second set of operational variables 125 is measured at time t−n (130) and again at least one additional time between time t−n and time t (135). A set of predicted process value metrics 140 is then produced based on the predicted values 120 for the first set of operational variables, and the second set of values 130 measured from time t−n to time t 135.

An illustrative description of the invention in the context of a plasma etch process utilized in the production of integrated circuits is provided below. However, it is to be understood that the present invention may be applied to any manufacturing production process including, but not limited to, semiconductor and integrated circuit manufacturing processes. In addition, it should be realized that the present invention is generally applicable to any complex multi-step production processes, such as, for example, circuit board assembly, automobile assembly and petroleum refining.

For example, in a plasma etch process the first set of operational process variables 105 may comprise manipulated variables of a plasma reactor, such as pressure, gas flow, reflected RF power, and the like. Preferably, the first set of operational process variables 105 comprises variables for which sufficient data exists to train a non-linear regression model on the relationship between past values of a plurality of the operational variables and the future value of a single operational variable. The second set of operational variables 125 may include, for example, other categories of operational parameters such as maintenance variables, manipulated variables (e.g., temperature, pressure, gas flows, and the like), and other variables such as information from sensors used to monitor a process or process tool (e.g., optical emission signals, ellipsometry signals, and the like).

The predicted process metrics 140 can comprise, for example, one or more metrics for the process, a sub-process, and/or process tool. For example, in a plasma etch process, the process metrics may be etch rate, etch uniformity, and thickness; whereas for an integrated circuit metallization process the metrics may be those for a sub-process (such as the via chain resistance) and/or the metrics for the overall process (such as the wafer IV (current-voltage) parameters).

Figure 2:
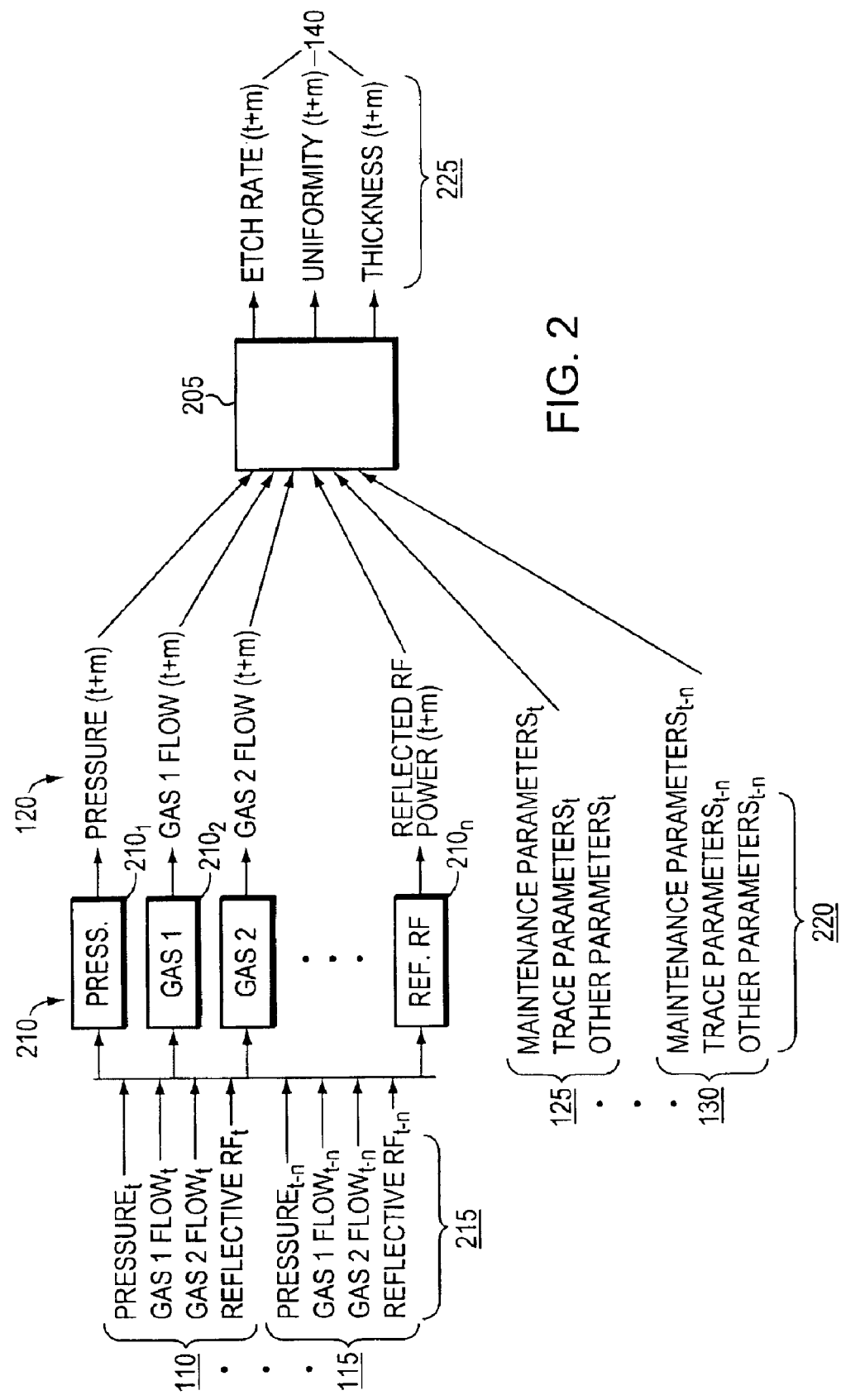
FIG. 2. is a more detailed example illustrating various embodiments of prediction of a process according to the present invention.

FIG. 2 illustrates such an implementation. Process operational variables such as the pressure of the plasma, the RF power, and process gas flow of one or more plasma reactors are measured at time t−n (115) up to time t (110). As illustrated, a non-linear regression model 205 is used to predict a set of process metric values 225 at, for example, a time t+m, based at least in part on a first set of predicted operational variable values 120 at time t+m for a first set of operational variables 215, and two or more prior process operational variable values (e.g., at time t−n) for each of a second set of operational variables 220. The likelihood of a process failure is then determined using one or more of the predicted process metric values 140. For example, the likelihood of a process failure at or about time t+m may be determined based on the number of predicted process metric values at time t+m that fall outside acceptable ranges of values and the degree to which the values deviate from the acceptable ranges. For example, with respect to predicting the failure of a vacuum system in a plasma reactor, the operational variables may be the observed pressure and gas flows within the chamber. Using the values of the chamber pressure and gas flows measured at time t−n up to time t, the system can predict the chamber pressure at a future time t+m. If the predicted value goes out of a specification limit or, in one exemplary embodiment, the 95th percentile of the empirical distribution, an alarm may be triggered.

More specifically, a set of non-linear regression models 210 is used to determine the first set of predicted operational variable values at time t+m. Preferably, each model 210₁, 210₂, . . . , 210ₙ of the set 210 has been trained in the relationship between one operational variable of the first set 215, and the prior values (e.g. , at time t−n up to time t) of two or more of the operational variables. The models are used to determine the first set of predicted operational variable values at time t+m. A second non-linear regression model 205 is then used to determine the predicted process metric values at time t+m using the first set of predicted operational variable values and two or more prior process operational variable values measured at time t−n up to time t 125 of the second set of operational variables 220.

Preferably, the non-linear regression models utilized in the present invention are neural network models, and in particular Markov models or hybrid neural network Markov models. Suitable Markov neural network models include, but are not limited to, hidden Markov models, discrete hidden Markov models, and continuous hidden Markov models.

Specifically, in one version, the neural network model and training is as follows. The output of the neural network, r, for a given variable k, is given by $$r_k = \sum_j \left[ W_{jk} \cdot \tanh\left(\sum_j W_{ij} \cdot x_i\right) \right]. \qquad \text{Eq. (1)}$$

This equation states that the $i^{th}$ element of the input vector x is multiplied by the connection weights $W_{ij}$. This product is then the argument for a hyperbolic tangent function, which results in another vector. This resulting vector is multiplied by another set of connection weights $W_{jk}$. The subscript i spans the input space (e.g., the input variables). The subscript j spans the space of hidden nodes, and the subscript k spans the output space (e.g., the output variables). The connection weights are elements of matrices, and may be found, for example, by gradient search of the error space with respect to the matrix elements.

The response error function for the minimization of the output response error is given by $$C = \left[\sum_j (t-r)^2\right]^{1/2} + \gamma \|W\|^2. \qquad \text{Eq. (2)}$$

The first term represents the root-square-error ("RSE") between the target t and the response r. The second term is a constraint that minimizes the magnitude of the connection weight W. If γ (called the regularization coefficient) is large, it will force the weights to take on small magnitude values. With this weight constraint, the response error function will try to minimize the error and force this error to the best optimal between all the training examples. The coefficient γ thus acts as an adjustable parameter for the desired degree of the nonlinearity in the model.

Figure 3:
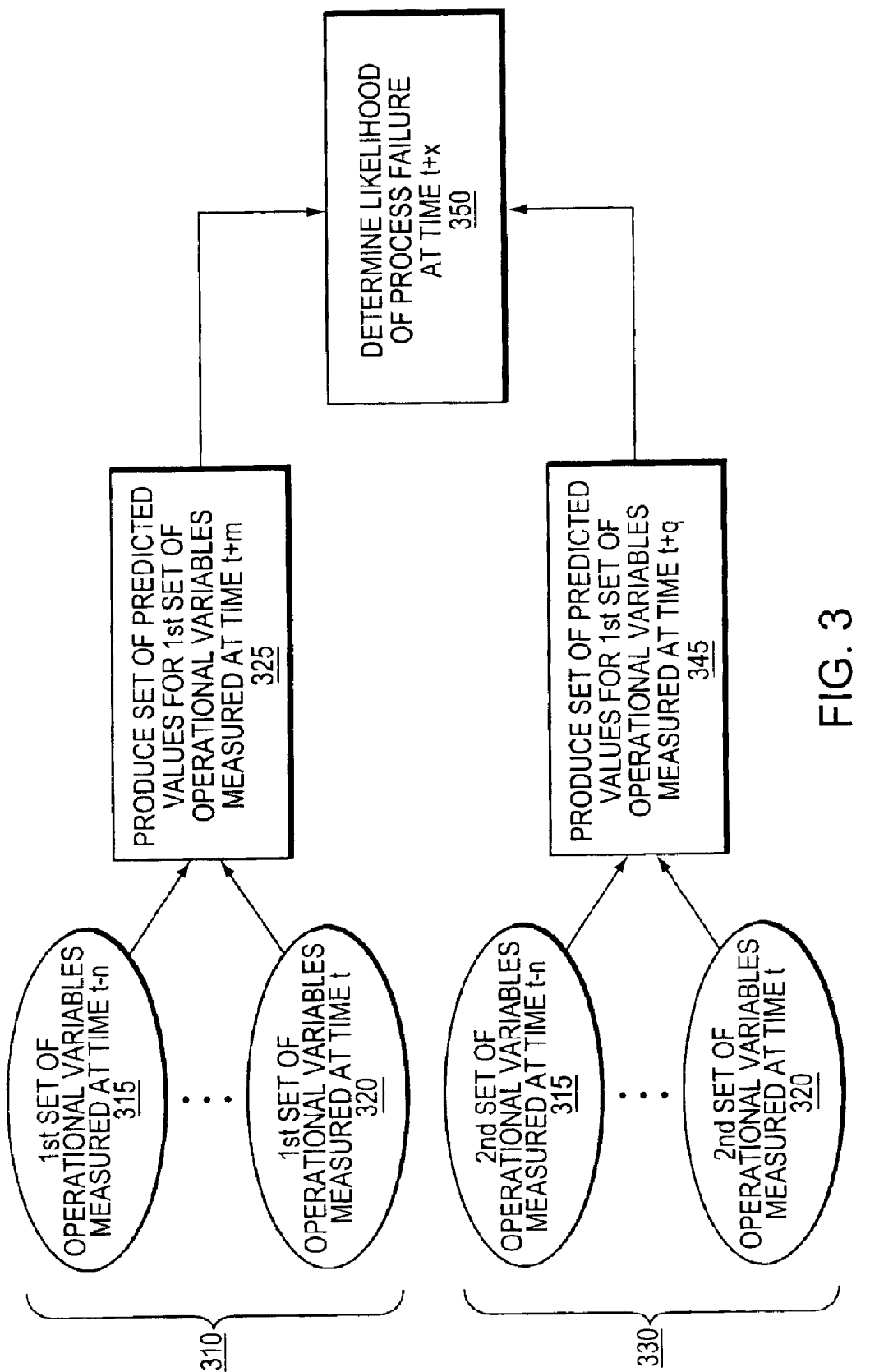
FIG. 3 is a flow diagram illustrating various embodiments of failure prediction for a process according to the present invention.

Referring to FIG. 3, in another embodiment, process failure prediction is based on prediction of operational variable values at two or more different times. A first set of operational variables 310 is measured at time t−n (315) and again at least one additional time up to time t (320) and a set of predicted values for the first set of operational values 310 at time t+m is produced 325. A second set of operational variables 330 is measured at time t−n 335 and again at least one additional time between time t−n and time t 340, and a set of predicted values for the second set of operational values 330 at time t+m is produced 345. Based on the predicted values for the first and second sets of operational values 320 and 340 respectively, the likelihood of a process failure occurring at time t+x is determined (350).

Figure 4:
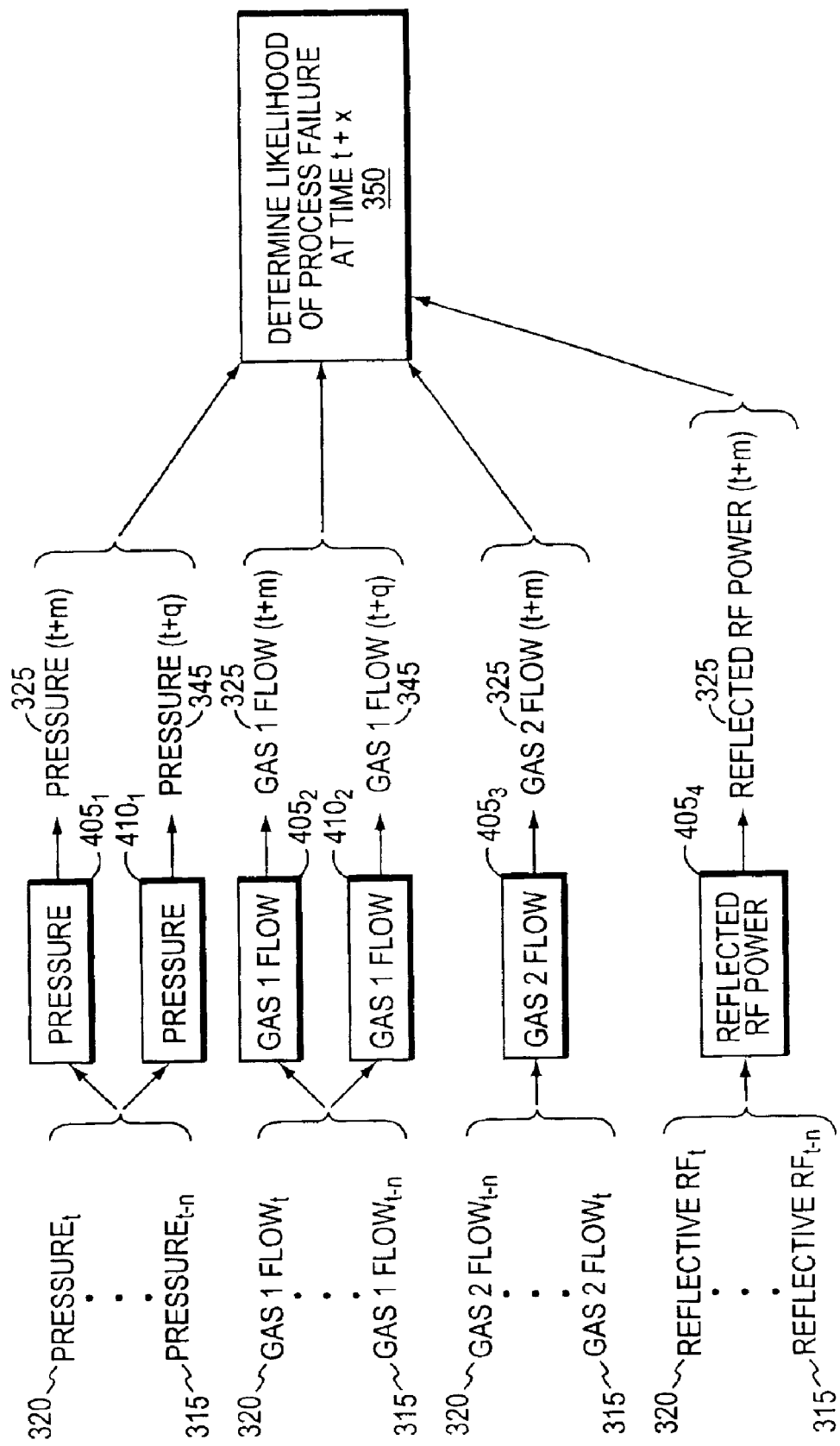
FIG. 4 is a more detailed example illustrating various embodiments of failure prediction for a process according to the present invention.

More specifically and as illustrated in FIG. 4, a first set of non-linear regression models 405 is used to predict a first set of process operational variables values 325 at a first time t+m from two or more prior (t−n, t) process operational variable values 315, 320 for each operational variable of the first set of operational variables. A second set of non-linear regression models 410 is then used to predict the future values of at least a subset of the first set of operational variables at a second time t+q (where q≠m) (345) from two or more prior process operational variable values 315, 320 for each operational variable of the subset. In some embodiments, the models 405 and 410 may be the same models, while in other embodiments the models 405 and 410 may be different models. In some embodiments, a subset of the models 405 and 410 may be the same for some operational variables, and different for other operational variables.

The likelihood of a process failure is then determined (350) using at least one or more of the predicted values of the operational variables at both the first time t+m and the second time t. For example, the likelihood of a process failure may be determined from the time behavior of the predicted operational variable values, such as from changes in the standard deviation of a value. As in the example above, the values of the chamber pressure and gas flows measured at time t−n up to time t are used to make predictions on the chamber pressure at time t+m through t+q into the future. If the predicted values violates some specification limit or exhibits a fluctuation, the system can cause an alarm indicating that a vacuum system malfunction may be imminent.

Figure 5:
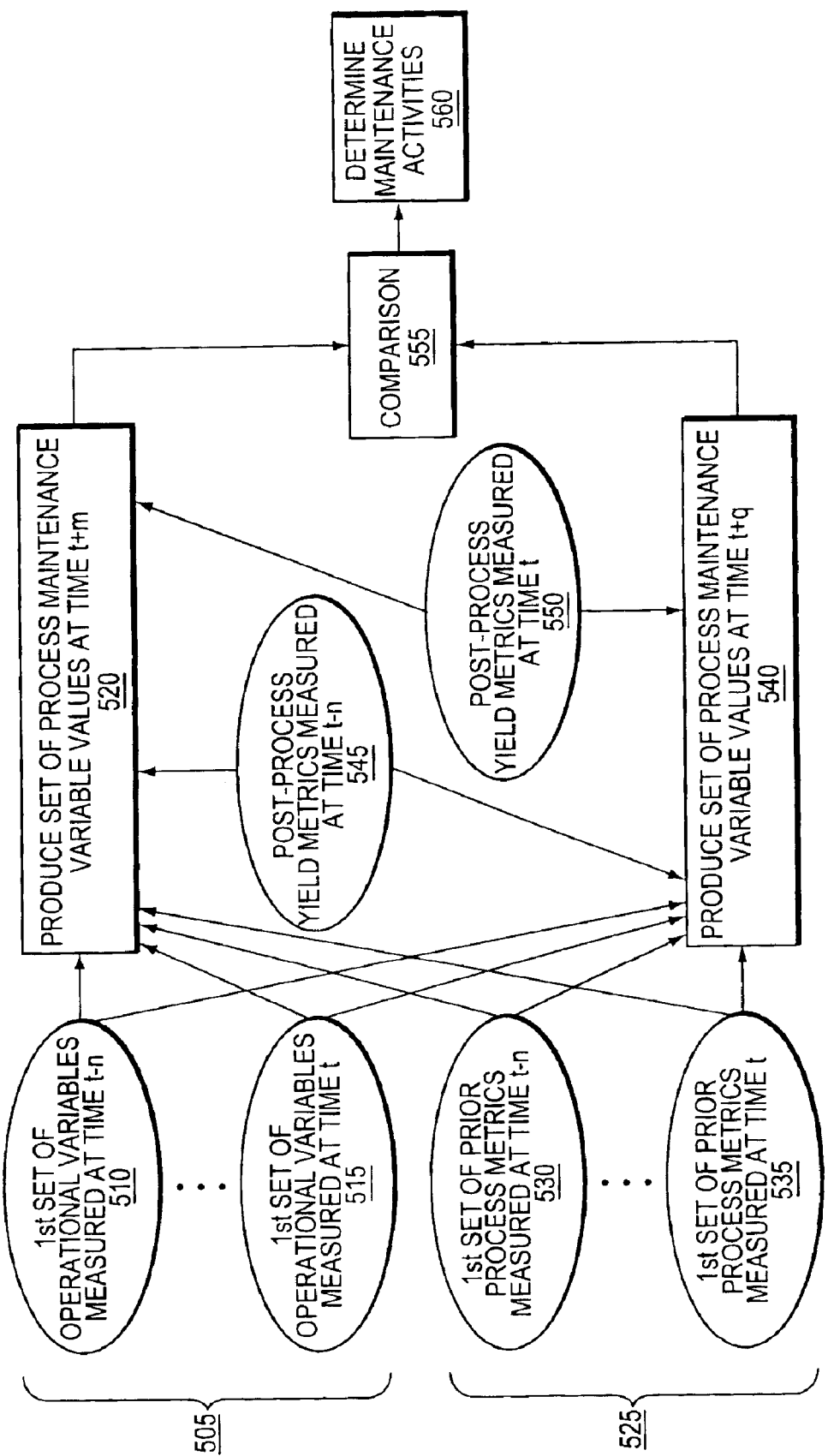
FIG. 5 is a flow diagram illustrating various embodiments of maintenance activity prediction for a process according to the present invention.

Referring to FIG. 5, in another embodiment, a first set of process maintenance variable values is predicted based on (i) predicted process operational variable values at two or more times and (ii) post-process yield metrics. A first set of operational variables 505 is measured at time t−n (510) and again at least one additional time up to time t (515). The operational variable values 505 are used, along with a set 545 of post-process yield metrics measured at time t−n to predict values for the first set of operational values at time t+m (520). A second set of operational variables 525 is measured at time t−n (530) and again at least one additional time up to time t (535). The operational variable values 525 are used, along with a set 550 of post-process yield metrics measured at time t to predict values for the second set of operational values at time t+m (540). Based on a comparison 555 between the predicted values for the first and second sets of operational values, 520 and 540 respectively, maintenance activities that may reduce or eliminate the likelihood of a process failure occurring at time t+x are determined (560).

Figure 6:
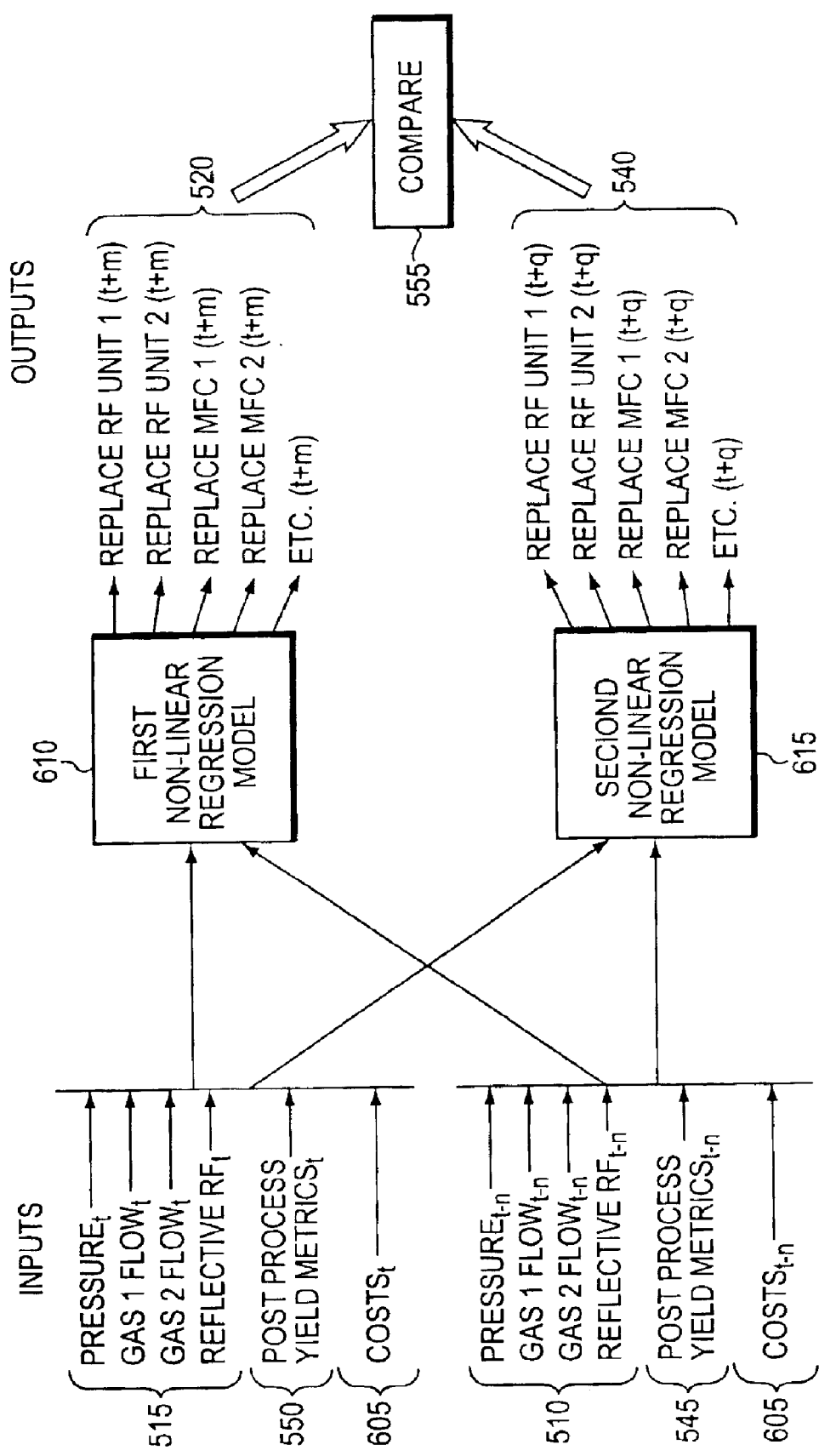
FIG. 6. is a more detailed example illustrating various embodiments of maintenance activity prediction for a process according to the present invention.

An example of this approach, using the plasma etch process described above, is illustrated in FIG. 6. A first non-linear regression model 610 is used to predict a first set of process maintenance variable values 520 at a first time t+m from two or more prior process operational variable values 515 and two or more prior post-process metric values 550. In addition, a second non-linear regression model 615 is used to predict a second set of process maintenance variable values 540 at a second time t+q from the two or more prior process operational variable values 510 and two or more prior process metric values 545. A comparison 555 of one or more of the process maintenance variable values predicted for the first time t+m to one or more process maintenance variable values predicted for the second time t+q is then used to determine one or more maintenance variable values.

The predicted maintenance variable values can be used, for example, to suggest a maintenance activity that is likely to decrease the rate of process failure. For example, for a plasma reactor that may be used in an integrated circuit plasma etch process, maintenance variables may include, e.g., the time since last replacement, and calibration or maintenance of the reactor's radio frequency ("RF") unit and mass flow controllers ("MFC"). The maintenance variables may have continuous, discrete and/or a binary values. Accordingly, a suggested maintenance activity may comprise, for example, replacement, calibration, cleaning or other maintenance of a RF unit and/or MFC.

The comparison used to determine a maintenance activity can take many forms. For example, the comparison may look for absolute changes, relative changes, or both between the first time t+m and the second time t+q in: (1) the values of the process maintenance variables; (2) the standard deviation of one or more values; (3) the differences between process maintenance variable values in a set; (4) the correlations between process maintenance variable values in a set; or (5) combinations of two or more of the above. For example, a maintenance activity may be determined from the time behavior of the predicted maintenance variable values, such as from relative changes in a value.

Further, it is to be understood that the method may be extended to use predictions of process maintenance variable values at a plurality of times, e.g. a third time (t+r), a fourth time (t+s), etc., and comparisons of one or more of the variable values at two or more of these times may be used to determine the need for a maintenance activity. For example, in addition to pair-wise comparison, the comparison may use values at three or more times to determine a time-dependent behavior of one or more process maintenance variable values. Examples of such time-dependent behavior include, but are not limited to, the rate of change of a process maintenance variable value and the rate of change in the correlation between process maintenance variable values.

In another embodiment, the non-linear regression models 610, 615 may further use two or more maintenance cost variable values 605 to constrain the sets of process maintenance variable values 520, 540. A maintenance cost variable can be representative, for example, of the actual monetary cost, or the time and labor, associated with performing a maintenance activity (e.g., electrode cleaning in a plasma reactor). A maintenance cost variable can also be representative of an intangible such as, for example, customer satisfaction, market perceptions, or business risk. Accordingly, it should be understood that it is not central to the present invention what, in actuality, a maintenance cost variable represents; rather, the numerical values associated with a maintenance cost variable may represent anything meaningful in terms of the application. Thus, it should be understood that the "cost" associated with a maintenance cost variable is not limited to monetary costs.

Figure 7:
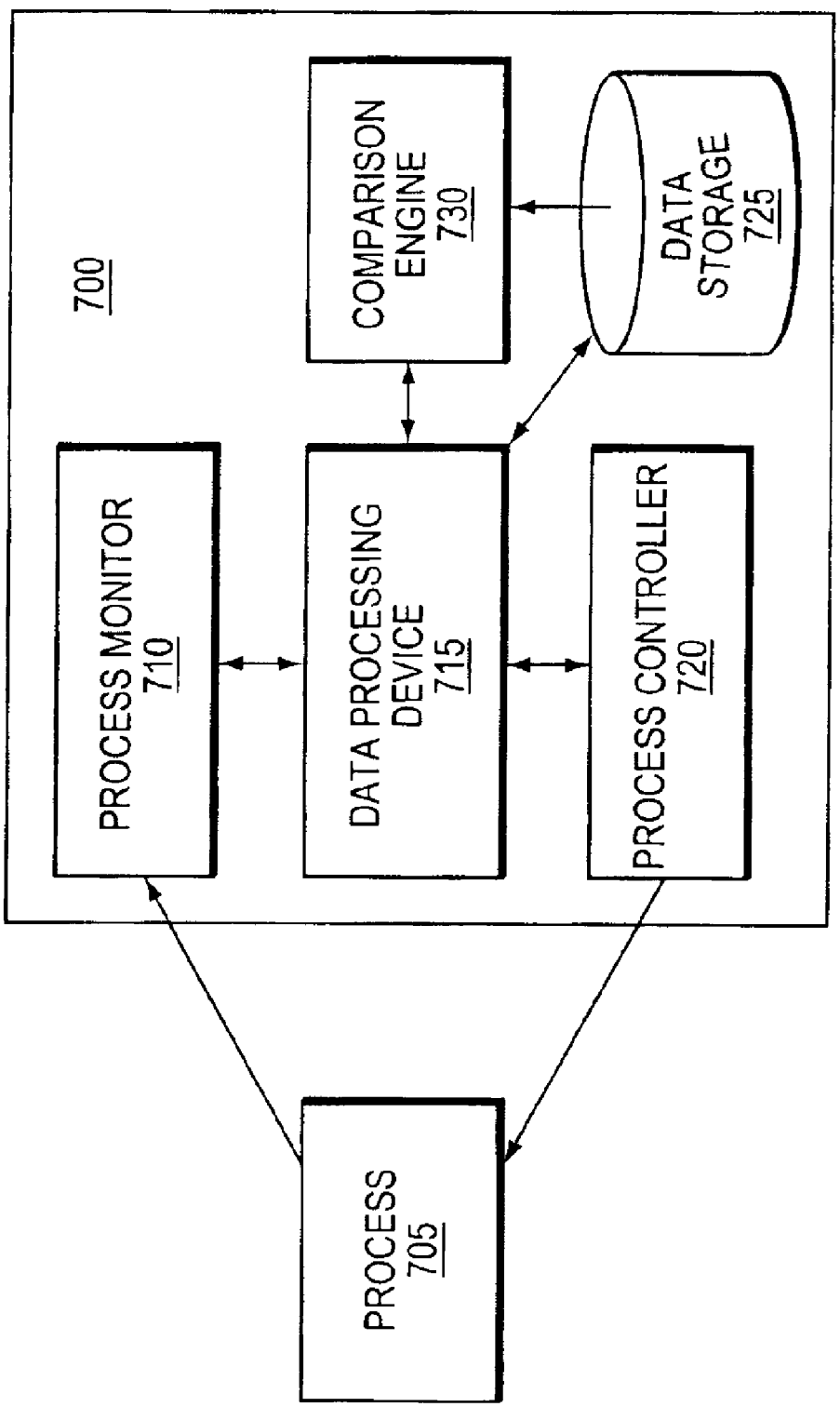
FIG. 7. is a schematic illustration of various embodiments of a system adapted to practice the methods of the present invention.

FIG. 7 schematically represents a hardware embodiment of the invention realized as a system 700 for predicting the failure of a process 705 with respect to actual and predicted operational variable values, post-process metric values, and maintenance cost values. The system 700 comprises a process monitor 710, a data processing device 715, a process controller 720, a data storage device 725, and a comparison engine 730.

The process monitor 710 receives operational variable values relating to the process 705. The values may reflect one or more aspects of the operation of the process 705, such as tool pressure, etch rate, or power supply, and/or the environment in which the process is operating, such as temperature, or other operational measurements. The process monitor 710 generally includes conventional ports and may also include circuitry for receiving time-varying analog data signals, and analog-to-digital conversion circuitry for digitizing the signals.

The process monitor 710 causes the operational variable values to be transmitted to the data processing device 715. The data processing device 715, using one or more of the techniques described above, predicts operational variable values at a future time. In some embodiments, the data processing device 715 may implement the functionality of the present invention in hardware, receiving signals indicative of the operational variable values in analog or digital form. In other embodiments, the data processing device 715 may implement the functionality of the present invention as software on a general purpose computer. In addition, such a program may set aside portions of a computer's random access memory to provide control logic that affects one or more of the measuring of metrics, the measuring of operational variables, the provision of maintenance activity costs, the prediction of metrics, the determination of metrics, the implementation of an comparison engine, determination of operational variables, and detecting deviations of or in a metric. In such an embodiment, the program may be written in any one of a number of high-level languages, such as FORTRAN, PASCAL, C, C++, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The comparison engine 730, using at least two sets of predicted operational variable values, determines maintenance variable values for the process 705 that reduce the likelihood of process failure. The comparison engine 730 then causes the maintenance variable values to be transmitted to the data processing device 715.

The data processing device 715, having received the maintenance variable values from the comparison engine 730, instructs the process controller 720 to implement one or more maintenance activities of the process 705 in such a manner as to reduce the likelihood of process failure. The process controller 720 may be, for example, a conventional programmable logic controller (PLC) or a group of PLCs that control one or more manipulable variables of the process, e.g., by governing valves, ports, machine controls, thermostats, etc. In some embodiments, the comparison engine 730 communicates directly with the process controller 720, sending instructions for implementing maintenance activities for the process 705.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of predicting failure in a process having associated metrics and a plurality of operational variables, the method comprising the steps of:
   using non-linear regression to predict values for a first set of operational variables based on two or more prior values thereof;
   using non-linear regression to predict a plurality of process metric values based on the first set of predicted values and prior values of two or more operational variables; and
   determining a likelihood of a process failure based on one or more of the predicted process metric values.

2. The method of claim 1, wherein the first set of predicted values is predicted by applying a separate non-linear regression model to each of the process operational variables, wherein each of the separate non-linear regression models has been trained in the relationship between a single process operational variable and prior values of two or more process operational variables.

3. The method of claim 2, further comprising repeating the steps of the method for at least one sub-process of the process.

4. The method of claim 2, further comprising repeating the steps of the method for a higher-level process comprising the process.

5. A method of predicting failure in a process having a plurality of operational variables associated therewith, the method comprising the steps of:
   using non-linear regression to predict values at a first time for a first set of operational variables based on two or more prior values thereof;
   using non-linear regression to predict values at a second time for a second set of operational variables based on two or more prior values thereof; and
   determining a likelihood of a process failure based on one or more of the predicted values for the process operational variables at the first time and the second time.

6. The method of claim 5, wherein the second set of process operational variables are at least a subset of the first set of process operational variables.

7. The method of claim 5 further comprising using non-linear regression to predict values at a third time for a third set of operational variables based on two or more prior values thereof.

8. The method of claim 7 further comprising using non-linear regression to predict values at a fourth time for a fourth set of operational variables based on two or more prior values thereof.

9. A method of predicting the need for maintenance activities for a process having a plurality of operational variables associated therewith, the method comprising the steps of:
   using non-linear regression to predict values at a first time for a first set of operational variables based on two or more prior values thereof;
   using non-linear regression to predict values at a second time for a second set of operational variables based on two or more prior values thereof; and
   determining the need for a maintenance action based at least in part on a comparison of the first set of predicted values with the second set of predicted values.

10. The method of claim 9 wherein the determining step is also based on process yield metrics.

11. The method of claim 9 wherein the step of predicting the second set of values at the second time is also based on process yield metrics.

12. The method of claim 9 wherein the first set of predicted values at the first time is constrained by cost data.

13. The method of claim 9 wherein the second set of predicted values at the second time is constrained by cost data.

14. A system for predicting events of a process having associated operational variables, the system comprising:
   (a) a process monitor for monitoring operational variables; and
   (b) a data processing device for receiving, from the process monitor, data indicative of values of the operational variables, and predicting events based on (i) a relationship between a first set of predicted values for a first set of process operational variables and two or more prior process operational variable values thereof, (ii) a relationship between a second set of predicted values for a second set of process operational variables and two or more prior process operational variable values thereof, and (iii) a relationship between a predicted process event, the first set of predicted values, and the second set of predicted values.

15. The system of claim 14 wherein the process event is a process failure.

16. The system of claim 14 wherein the process event is a maintenance activity.

17. A system for predicting failure in a process having associated operational variables, the system comprising:
(a) a process monitor for monitoring operational variables; and
(b) a data processing device for receiving, from the process monitor, data indicative of values of the operational variables, and predicting process failure based on (i) a relationship between a first set of predicted values at a first time for a first set of process operational variables and two or more prior process operational variable values thereof, (ii) a relationship between a second set of predicted values at a second time for a second set of process operational variables and two or more prior process operational variable values thereof, and (iii) a relationship between a process failure, the first set of predicted values at a first time, and the second set of predicted values at a second time.

18. A system for predicting the need for maintenance activities in a process having associated operational variables and process metrics, the system comprising:
(a) a process monitor for monitoring operational variables; and
(b) a data processing device for receiving, from the process monitor, data indicative of values of the operational variables, and predicting process failure based on (i) a relationship between a first set of predicted values at a first time for a first set of process operational variables and two or more prior process operational variable values thereof, (ii) a relationship between a second set of predicted values at a second time for a second set of process operational variables and two or more prior process operational variable values thereof, and (iii) a relationship between a need for a maintenance activity, the first set of predicted values at a first time, and the second set of predicted values at a second time.

19. The system of claim 18 further comprising a process controller, responsive to the data processing device, for performing maintenance activities based on the predicted process event.

20. The system of claim 18 further comprising a data storage device for storing one or more of maintenance activity records and maintenance activity costs.

* * * * *